United States Patent
Lin et al.

(10) Patent No.: US 8,026,803 B2
(45) Date of Patent: Sep. 27, 2011

(54) APPARATUS AND PROCESS FOR MONITORING A VEHICLE CONDITION

(75) Inventors: Xing Ping Lin, Orchard Lake, MI (US); Steven Thomas Skalski, Redford, MI (US)

(73) Assignees: TRW Automotive U.S. LLC, Farmington Hills, MI (US); Michelin Rechereche et Techinique S.A., Granges-Paccot (CH)

( * ) Notice: Subject to any disclaimer, the term of this patent is extended or adjusted under 35 U.S.C. 154(b) by 271 days.

(21) Appl. No.: 12/080,036

(22) Filed: Mar. 31, 2008

(65) Prior Publication Data
US 2009/0243829 A1    Oct. 1, 2009

(51) Int. Cl.
  *B60C 23/00* (2006.01)
(52) U.S. Cl. ........................ 340/445; 340/447
(58) Field of Classification Search ........... 340/442–447
  See application file for complete search history.

(56) References Cited

U.S. PATENT DOCUMENTS

| | | | |
|---|---|---|---|
| 5,463,374 A | 10/1995 | Mendez et al. | |
| 5,500,637 A | 3/1996 | Kokubu | |
| 5,783,992 A | 7/1998 | Eberwine et al. | |
| 6,232,875 B1 | 5/2001 | DeZorzi | |
| 6,420,967 B1 | 7/2002 | Ghabra et al. | |
| 6,448,892 B1 | 9/2002 | Delaporte | |
| 6,650,236 B2 | 11/2003 | Ghabra et al. | |
| 6,774,779 B2 | 8/2004 | Lin | |
| 6,885,282 B2 | 4/2005 | Desai et al. | |
| 6,885,283 B2 | 4/2005 | O'Connor et al. | |
| 6,967,570 B2 | 11/2005 | Tsuji et al. | |
| 7,019,628 B2 | 3/2006 | Ichinose | |
| 7,026,953 B2 | 4/2006 | Fujii | |
| 7,030,740 B2 | 4/2006 | Huang | |
| 7,040,154 B2 | 5/2006 | Shaw et al. | |
| 7,053,761 B2 | 5/2006 | Schofield et al. | |
| 7,068,158 B2 | 6/2006 | Komatsu et al. | |
| 7,113,083 B2 | 9/2006 | Suitsu | |
| 7,119,661 B2 | 10/2006 | Desai et al. | |
| 7,154,414 B2 | 12/2006 | King et al. | |
| 7,215,243 B2 | 5/2007 | Rimkus et al. | |
| 2004/0036589 A1 | 2/2004 | Lin | |
| 2005/0258949 A1* | 11/2005 | Iwazumi | 340/442 |
| 2006/0238324 A1* | 10/2006 | Kachouh et al. | 340/442 |
| 2006/0279411 A1* | 12/2006 | Reimus et al. | 340/447 |

* cited by examiner

*Primary Examiner* — Thomas Mullen
(74) *Attorney, Agent, or Firm* — Tarolli, Sundheim, Covell & Tummino LLP

(57) ABSTRACT

An apparatus for monitoring a vehicle condition comprises a sensor for sensing the vehicle condition and a transmitter for transmitting signals indicative of the sensed vehicle condition. The transmitted signals include a first signal set and a second signal set. A receiver mountable on the vehicle is provided for receiving the transmitted signals. The receiver has a first operating state when the vehicle ignition is OFF and a second operating state when the vehicle ignition is ON. The first signal set includes a wake-up portion to wake up the receiver when the receiver is in its first operating state and an information portion. The second signal set includes an information portion. The transmitted signals include at least one first signal set and at least one second signal set during a predetermined time period when the vehicle ignition is OFF and when the vehicle ignition is ON.

13 Claims, 2 Drawing Sheets

APPARATUS AND PROCESS FOR MONITORING A VEHICLE CONDITION

TECHNICAL FIELD

The present invention is directed to monitoring a vehicle condition and, more particularly, to an apparatus and a process for wirelessly monitoring a vehicle tire condition.

BACKGROUND OF THE INVENTION

It is known to monitor a condition of a vehicle component, such as tire pressure. This may be accomplished wirelessly. In such tire pressure monitoring systems, each tire has an associated tire pressure sensor and a radio frequency ("RF") transmitter mounted to its wheel so as to be on the inside of the tire. The tire pressure sensed by each tire pressure sensor is transmitted by its associated RF transmitter to a receiver located onboard the vehicle. The tire pressure information delivered to the on-board receiver via the RF signals from each of the transmitters is subsequently conveyed to a vehicle operator or occupant, typically in the form of a display in the vehicle occupant compartment.

The RF transmitters used in such tire pressure monitoring systems are typically battery powered and are energized for limited operating times so as to extend the life of the transmitter batteries. The transmitters usually transmit tire pressure information at time intervals that are shorter when the vehicle is moving and longer when the vehicle is not moving.

The vehicle-mounted receiver in such tire pressure monitoring systems can either assume an inactive state when the vehicle ignition is OFF or can alternate between active and inactive states to reduce current draw on the vehicle battery. As a result, the tire pressure information from the tire-mounted transmitters often must include a wake-up signal to ensure receipt of the transmitted pressure signal by the vehicle-mounted on-board receiver. The requirement to transmit an additional wake-up signal will shorten the life of the transmitter battery. A wake-up signal, however, is transmitted only when the vehicle has been stationary for a predetermined period of time. Motion of the vehicle is generally detected by a tire motion sensor in each tire.

SUMMARY OF THE INVENTION

The present invention is directed to monitoring a vehicle condition and, more particularly, to an apparatus and a process for wirelessly monitoring a vehicle tire condition.

In accordance with one representative embodiment of the invention, an apparatus for monitoring a vehicle condition comprises a sensor for sensing the vehicle condition and a transmitter for transmitting signals indicative of the sensed vehicle condition. The transmitted signals including a first signal set and a second signal set. A receiver mountable on the vehicle is provided for receiving the transmitted signals. The receiver has a first operating state when the vehicle ignition is OFF and a second operating state when the vehicle ignition is ON. The first signal set includes a wake-up portion to wake up the receiver when the receiver is in its first operating state and an information portion. The second signal set includes an information portion. The transmitted signals include at least one first signal set and at least one second signal set during a predetermined time period when the vehicle ignition is OFF and when the vehicle ignition is ON.

Also in accordance with the invention, an apparatus is provided for remote monitoring of tire pressure in a vehicle having at least one tire. The apparatus comprises a tire monitor for mounting in a tire. The tire monitor comprises a sensor for sensing tire pressure and a transmitter for wirelessly transmitting tire pressure signals representative of the sensed tire pressure. The transmitted tire pressure signals include a first signal set and a second signal set. A receiver mountable on the vehicle is provided for receiving the transmitted tire pressure signals. The receiver has at least an inactive state when an ignition switch in the vehicle is OFF. The transmitter transmits the tire pressure signals at predetermined time intervals and also wirelessly transmits wake-up signals associated with some of the tire pressure signals to ensure receipt by the receiver of the transmitted tire pressure signals when the receiver is in the inactive state. The transmitter transmits the tire pressure signals and the wake-up signals such that, during a predetermined time period when the ignition switch is OFF and when the ignition switch is ON, at least one tire pressure signal is transmitted with an associated wake-up signal and at least one tire pressure signal is transmitted free of an associated wake-up signal.

In accordance with another representative embodiment of the invention, a process is provided for monitoring a vehicle condition. The process comprises the step of sensing a vehicle condition and the step of transmitting signals indicative of the sensed vehicle condition. The transmitted signals include a first signal set and a second signal set. The process also comprises the step of receiving the transmitted signals. The transmitted signals are received by a receiver having one operating state when a vehicle ignition is OFF and a second operating state when the vehicle ignition is ON. The first signal set includes a wake-up portion to wake up the receiver when the receiver is in the first operating state and an information portion. The second signal set includes an information portion. At least one first signal set and at least one second signal set are transmitted during a predetermined time period when the vehicle ignition is OFF and when the vehicle ignition is ON.

Also in accordance with the invention, a process is provided for monitoring tire pressure in a vehicle having at least one tire. The process comprises the steps of sensing tire pressure in the at least one tire and the step of wirelessly transmitting tire pressure signals representative of the sensed tire pressure. The process also includes the step of wirelessly transmitting wake-up signals with some of the tire pressure signals. The process further includes the step of receiving the tire pressure signals and the wake-up signals using a receiver having at least an inactive state when an ignition switch in the vehicle is OFF. The wake-up signals ensure receipt of the tire pressure signals when the receiver is in the inactive state. The tire pressure signals and the wake-up signals being transmitted such that, during a predetermined time period when the ignition switch in the vehicle is OFF and when the ignition switch in the vehicle is ON, at least one tire pressure signal is transmitted with an associated wake-up signal and at least one tire pressure signal is transmitted free of an associated wake-up signal.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
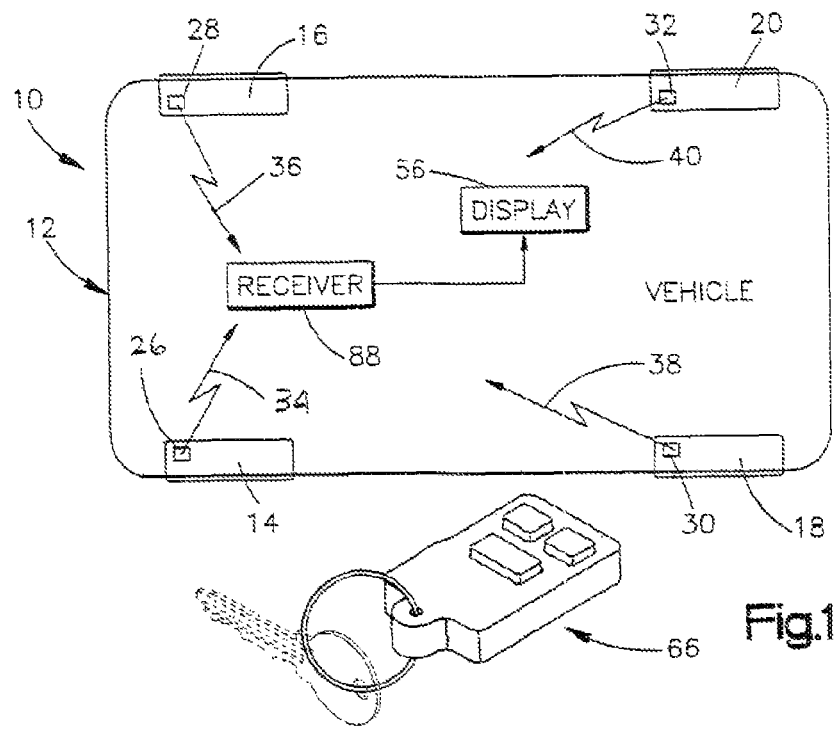
FIG. 1 is a schematic block diagram of an apparatus constructed in accordance with a representative embodiment of the present invention.

FIG. 1 of the drawings illustrates an apparatus 10 in accordance with an example embodiment of the present invention mounted in a vehicle 12. The vehicle 12 includes four tires 14, 16, 18, and 20. The vehicle 12 could, however, have a number of tires other than four.

Each tire 14, 16, 18, and 20 of the vehicle 12 includes an associated tire condition monitor 26, 28, 30, and 32, respectively, for sensing a condition of the tire. The tire condition may be, for example, the gas pressure within the tire or the temperature of tire. Each tire condition monitor 26, 28, 30, and 32 is of a known design. For example, U.S. Pat. No. 6,232,875, which is assigned to the assignee of the present invention, discloses a known tire condition monitor that may be used in the present invention.

Figure 2:
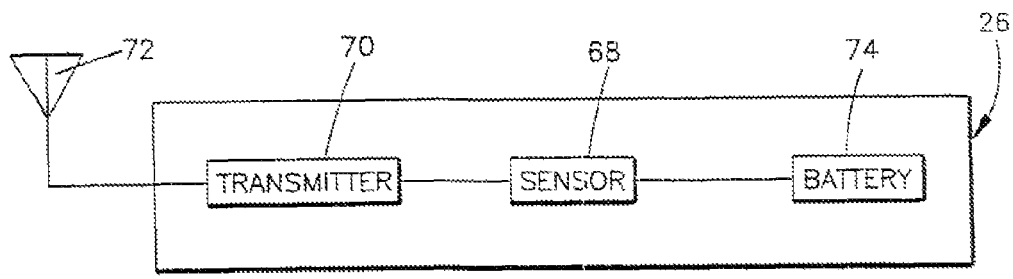
FIG. 2 is a schematic functional block diagram of a tire condition monitor used in the apparatus of FIG. 1.

By way of example, tire condition monitor 26 is illustrated schematically in FIG. 2 and is representative of each of the other tire condition monitors 28, 30, and 32. As shown in FIG. 2, tire condition monitor 26 includes a sensor 68 for sensing the gas pressure in the associated tire 14. The tire condition monitor 26 may also include additional sensors to sense other tire parameters, including, but not limited to, temperature, in any manner known in the art.

Tire condition monitor 26 also includes a transmitter 70 in communication with the pressure sensor 68. Transmitter 70 is coupled to an antenna 72 to transmit tire pressure signals 34 that are indicative of the tire pressure sensed by the pressure sensor 68. The tire pressure signals 34 convey pressure information for the associated tire 14 to an on-board receiver 88. Tire pressure signals 34 are preferably radio frequency ("RF") signals, although other signal types known in the art could be employed.

Figure 3A:
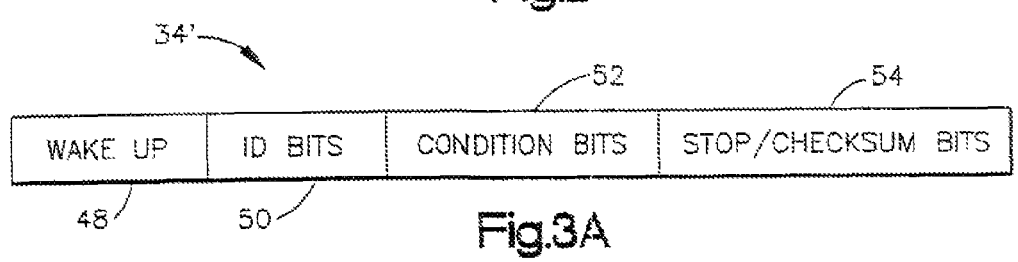
FIGS. 3A and 3B are schematic illustrations of the message packets used in the apparatus of FIG. 1.

In the embodiment of FIG. 1, each of tire pressure signals 34, 36, 38 and 40 from tire condition monitors 26, 28, 30, and 32, respectively, includes a message packet or word that is amplitude shift keyed onto a carrier signal. The message packet can be in one of two forms. FIG. 3A schematically illustrates one form of a message packet 34' for the tire condition signal 34 from the tire condition monitor 26. The message packet 34' begins with a preamble or wake-up signal portion 48, which is followed by an identification portion 50. The identification portion 50 includes a unique identification of the respective tire condition monitor 26. The identification portions of the tire condition signals 34, 36, 38 and 40 are unique. In the message packet 34', a tire condition portion 52 follows the identification portion 50. The tire condition portion 52 includes data indicating the sensed tire condition or conditions. The message packet 34' ends with a post-amble or checksum 54. An information portion of the message packet 34' comprises one or more of the portions 50, 52, and 54, but not the portion 48.

Figure 3B:
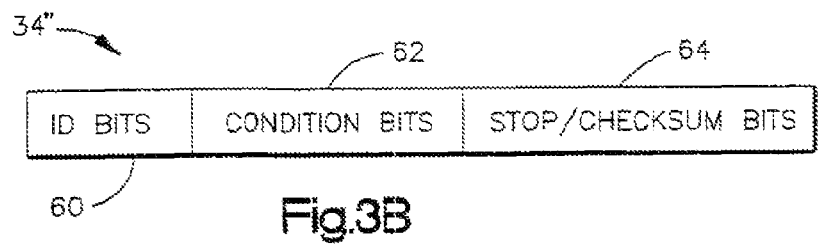

FIG. 3B schematically illustrates a second form of message packet 34" for the tire condition signal 34. The message packet 34" begins with an identification portion 60. The identification portion 60 includes a unique identification of the respective tire condition monitor 26. A tire condition portion 62 follows the identification portion 60. The tire condition portion 62 includes data indicating the sensed tire condition or conditions. The message packet 34" ends with a post-amble or checksum 64. The message packet 34" does not include and, thus, is free of a preamble or wake-up portion. An information portion of the message packet 34" comprises one or more of the portions 60, 62, and 64.

Although a wake-up signal portion 48 is preferably provided as part of a message packet 34' for tire pressure signals 34, such as in the form of a preamble or a header to the message packet 34', a wake-up signal could also be provided separately from the tire pressure signal 34. As another alternative, the wake-up signal could be in the form of a message packet or word that includes an identification portion 50, a tire condition portion 52, and a checksum 54, all of which are immediately repeated to provide the required information to the on-board receiver 88.

The tire pressure signals 34, including the wake-up signal portions 48 of message packets 34', may be modulated in any fashion known in the art, such as by Amplitude Shift Keying ("ASK") or Frequency Shift Keying ("FSK"). The tire pressure signals 34 and the wake-up signal portions 48 may be modulated in the same or different fashions (e.g., ASK modulation for the wake-up signals and FSK modulation for the tire pressure signals), whether transmitted together or separately. The tire pressure signals 34 may also include information regarding other tire parameters, such as temperature.

The tire pressure monitor 26 further includes a battery 74. The battery 74 provides power to at least the transmitter 70. The tire pressure signals 34 may include information or a signal or a message packet portion representative of the status of the battery 74, including a low battery status. As will be described in greater detail below, information concerning tire pressure, possibly with information concerning any other tire and/or battery parameters, is ultimately conveyed to a vehicle operator (not shown). This is typically accomplished using a visual display device 56, although audible means such as tones or speech warnings may also be used.

As seen in the embodiment shown in FIG. 1, the display device 56 is mounted on the vehicle 12, preferably on or near the instrument panel (not shown) of the vehicle within view of the vehicle operator. The display device 56 provides a visual indication of each sensed tire condition, such as tire pressure, to a vehicle occupant (not shown). Display device 56 may comprise an LED display or a lighted icon in an instrument panel of the vehicle 12. Audible means, such as tones or speech, may alternatively or additionally be used to convey tire pressure information to a vehicle occupant.

As also shown in FIG. 1, the on-board receiver 88 is mounted on the vehicle 12. The on-board receiver 88 is adapted to receive various signals, including the tire condition signals 34, 36, 38 and 40 from each of the tires 14, 16, 18 and 20, respectively. The on-board receiver 88 is operatively connected to the display device 56. In response to receiving a tire condition signal 34, 36, 38 or 40, the on-board receiver 88 outputs tire condition information to the display device 56. Although the on-board receiver 88 and the display device 56 are shown as being mounted on the vehicle 12, an on-board receiver and display device could alternatively or additionally be incorporated in a portable device, such as a fob 66. The fob 66 may also perform other functions, such as remote keyless entry.

Figure 4:
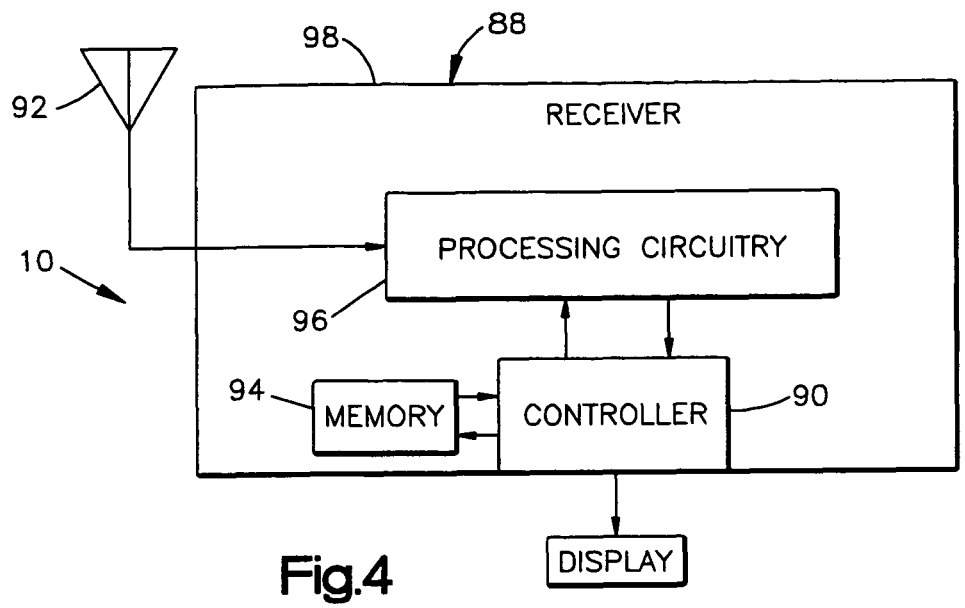
FIG. 4 is a schematic functional block diagram of an on-board receiver used in the apparatus of FIG. 1.

The on-board receiver 88, as shown in FIG. 4, includes a controller 90. In one example embodiment of the invention, the controller 90 could be a microcomputer. The on-board receiver 88 also includes an antenna 92, a memory 94, and signal processing circuitry 96. The antenna 92, illustrated in FIG. 4, may be external to the on-board receiver 88, but could be located within a housing 98 of the on-board receiver 88. The antenna 92 is operatively connected to the signal processing circuitry 96. When the antenna 92 receives a signal from one of the tire transmitters 70, the signal is input to the signal processing circuitry 96. The signal processing circuitry 96 decodes and demodulates the received tire transmitter signals. The functions of the signal processing circuitry 96 may be performed by the controller 90 using a software routine in the controller.

The controller 90 is operatively connected to the memory 94. The controller 90 may send information to the memory 94 for storage and may also retrieve information stored in the memory. Preferably, the memory 94 is a non-volatile memory. The memory 94 may form a portion of the controller 90.

The memory 94 stores a plurality of identifications, including identification information corresponding to each of the tire condition monitors 26, 28, 30 and 32 and an identification corresponding to each authorized fob 66 for the vehicle 12. The memory 94 also includes vehicle corner location identification information so as to associate each tire condition monitor 26, 28, 30 and 32 with a corner location. For example, one of the stored tire condition monitor identifications is associated with the left-front tire 14 of the vehicle 12, another with the right-front tire 16, and so on. This location association may be accomplished through one of several known "learning" processes known in the art.

When the ignition of the vehicle 12 is ON, on-board receiver 88 can remain continuously active. When the on-board receiver 88 is active, antenna 92 and signal processing circuitry 96 are looking for a data packet to process. To reduce current draw when the ignition is OFF, however, on-board receiver 88 enters an inactive state.

Considering only the transmission of tire pressure signals 34, including message packets 34' and 34", at least some of the tire pressure signals 34 from the tire transmitter 70 of tire condition monitor 26 must include a wake-up signal portion 48 to wake the on-board receiver 88 from its inactive state and ensure receipt of the tire transmitted signals by the on-board receiver 88.

Transmitting a wake-up signal portion 48 with every tire pressure signal 34, however, would shorten the life of the associated transmitter battery 74. Such a wake-up portion of the signal is particularly unnecessary if the ignition is ON and the on-board receiver 88 is energized. Accordingly, the tire pressure signals 34 transmitted by the transmitter 70 associated with tire condition monitor 26 include message packets 34' having a wake-up signal portion 48 intermixed with message packets 34" having no wake-up signal portion. The transmission pattern of message packets 34' and 34" in tire pressure signals 34 is representative of the transmission pattern of corresponding message packets in the tire pressure signals 36, 38 and 40 transmitted by the transmitters 70 associated with tire condition monitors 28, 30 and 32, respectively.

Figure 5:
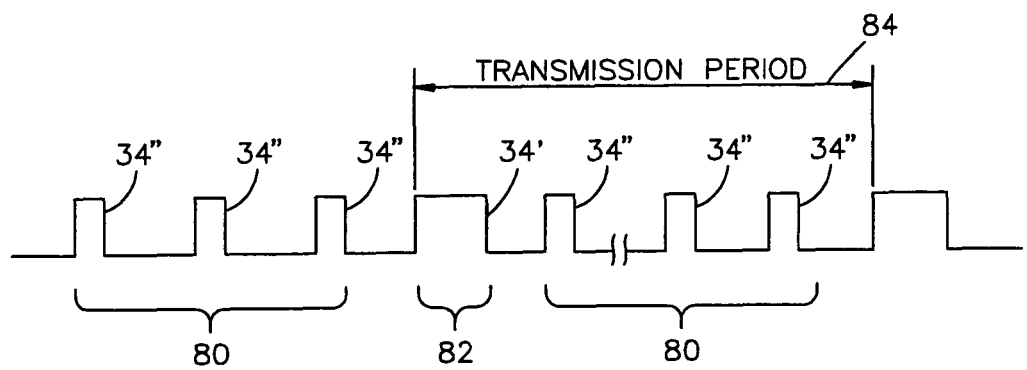
FIG. 5 is a schematic illustration of the transmission sequence of message packets of FIGS. 3A and 3B.

In accordance with one example embodiment of the invention, message packets 34' having a wake-up signal portion 48 are alternated with message packets 34" having no wake-up signal. Thus, a first signal set comprising a single message packet 34" having no wake-up packet portion precedes and follows each second signal set comprising a single message packet 34' having a wake-up portion 48. In accordance with yet another example embodiment, illustrated in FIG. 5, a first signal set 80 comprising two or more message packets 34" that have no wake-up portion may be transmitted before a second signal set 82 having a single message packet 34' that has a wake-up portion 48 is transmitted. For example, one message packet 34" that has no wake-up portion may be transmitted every three minutes until nine such message packets 34", which constitute a first signal set 80, have been transmitted. These nine message packets 34" may then be followed by a single message packet 34' that has a wake-up portion 48 and that is transmitted three minutes after the ninth message packet 34". The single message packet 34' would constitute a second signal set 82. Three minutes after transmission of the single message packet 34', the foregoing transmission sequence of nine message packets 34" and a single message packet 34' may be repeated, beginning with the transmission of the first of the nine message packets 34".

Regardless of the transmission sequence used for the tire pressure signals 34, at least one message packet 34' that has a wake-up portion 48 and at least one message packet 34" that does not have a wake-up portion will be transmitted within a predetermined time period 84. This approach avoids having to determine whether the ignition of the vehicle 12 is OFF or ON or whether the vehicle is stationary or moving. The apparatus 10 thus can avoid including a vehicle condition sensor to detect whether the ignition of the vehicle 12 is OFF or ON and avoid including a vehicle or tire motion sensor to detect whether the vehicle is stationary or moving.

The approach of transmitting, within a predetermined time period, at least one message packet that has a wake-up portion and at least one message packet that does not have a wake-up portion is used by each transmitter 70 associated with each of the tire pressure monitors 26, 28, 30 and 32. The pattern or sequence of message packets may be identical for all of the transmitters 70 or may be different for one or more of the transmitters. Also, the pattern or sequence of message packets may vary over time for each individual transmitter 70. Further, the pattern or sequence of message packets may be random, provided at least one message packet that has a wake-up portion and at least one message packet that does not have a wake-up portion are transmitted within a predetermined time period.

Information concerning other tire parameters, such as temperature and/or the status of transmitter batteries 74, may also be conveyed to a vehicle occupant via the controller 90 and display device 56. The information conveyed to the vehicle occupant may include a warning, which may also be audible, if tire pressure or another tire parameter, such as temperature and/or battery status, is outside a recommended range.

Figure 6:
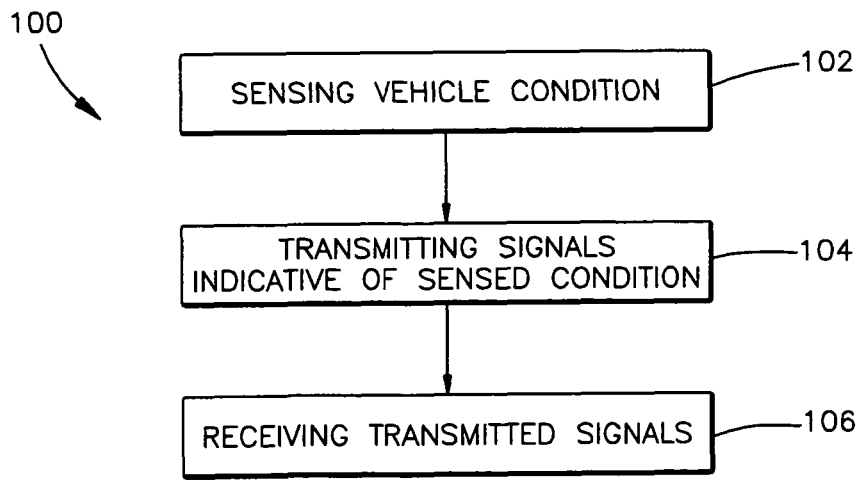
FIG. 6 is a flow diagram illustrating a process in accordance with a representative embodiment of the present invention.

FIG. 6 is a flowchart showing a tire condition monitoring process in accordance with one example embodiment of the present invention, denoted generally by reference numeral 100. The process 100 includes a step 102 in which a vehicle condition, such as tire pressure, is sensed. From step 102, the process 100, in step 104, transmits signals indicative of the sensed vehicle condition. The transmitted signals include a first signal set and a second signal set. The process 100 further includes a step 106 of receiving the transmitted signals from step 104. The transmitted signals are received by a receiver having one operating state when a vehicle ignition is OFF and a second operating state when the vehicle ignition is ON. The first signal set includes a wake-up portion to wake up the receiver when the receiver is in the first operating state. The second signal set is free of a wake-up portion. At least one first signal set and at least one second signal set are transmitted during a predetermined time period when the vehicle ignition is OFF and when the vehicle ignition is ON.

The transmission step 104 of the process 100 may carried out using a pattern or sequence of message packets in which message packets having a wake-up signal portion are alternated with message packets having no wake-up signal portion. Thus, a first signal set comprising a single message packet having no wake-up packet portion precedes and follows each second signal set comprising a single message packet having a wake-up portion. Alternatively, a first signal set comprising two or more message packets that have no wake-up portion may be transmitted before a second signal set having a single message packet that has a wake-up portion is transmitted. The pattern or sequence of message packets may vary over time or may be random, provided at least one message packet that has a wake-up portion and at least one message packet that does not have a wake-up portion are transmitted within a predetermined time period.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for monitoring a vehicle condition comprising:
   a sensor for sensing the vehicle condition;
   a transmitter for transmitting signals indicative of the sensed vehicle condition, the transmitted signals including a first signal set and a second signal set; and
   a receiver mountable on the vehicle for receiving the transmitted signals, said receiver having an inactive state and an active state;
   the first signal set including a wake-up portion to wake up the receiver when the receiver is in its inactive state and an information portion, the second signal set including an information portion free of a wake-up portion, the signal sets being transmitted in a predetermined repeated pattern within a predetermined time period, each pattern of the transmitted signal sets within the predetermined time period having at least one of the first signal set and at least one of the second signal set, and the pattern of the transmitted signal sets being independent of vehicle movement and vehicle ignition ON and OFF state.

2. The apparatus of claim 1 wherein the pattern of the transmitted signal sets includes the first signal set and the second signal set being transmitted alternately during said predetermined time period.

3. The apparatus of claim 1 wherein the pattern of the transmitted signal sets includes the second signal set being transmitted at least twice in succession and the first signal set being transmitted only once.

4. The apparatus of claim 1 wherein the transmitter transmits the signals wirelessly.

5. The apparatus of claim 1 wherein the sensed vehicle condition is pressure in at least one tire for the vehicle.

6. A process for monitoring a vehicle condition comprising:
   sensing a vehicle condition;
   transmitting signals indicative of the sensed vehicle condition, the transmitted signals including a first signal set and a second signal set; and
   receiving the transmitted signals, the transmitted signals being received by a receiver having an inactive state and an active state;
   the first signal set including a wake-up portion to wake up the receiver when the receiver is in its inactive state and an information portion, the second signal set including an information portion free of a wake-up portion,
   the signal sets being transmitted in a repeated predetermined pattern during a predetermined time period independent of vehicle movement and vehicle ignition ON and OFF state.

7. The process of claim 6 wherein the transmission pattern of transmitted signal sets includes the first signal set and the second signal set being transmitted alternately.

8. The process of claim 6 wherein the transmission pattern of transmitted signal sets includes the second signal set being transmitted at least twice in succession and the first signal set being transmitted only once.

9. The process of claim 6 wherein the signals are transmitted wirelessly.

10. The process of claim 6 wherein the sensed vehicle condition is pressure in at least one tire for the vehicle.

11. A process for remotely monitoring tire pressure in a vehicle having at least one tire, the process comprising:
    (a) sensing tire pressure in said at least one tire;
    (b) wirelessly transmitting a first tire pressure signal set representative of the sensed tire pressure;
    (c) wirelessly transmitting a second tire pressure signal set having a wake-up signal; and
    (d) receiving the first tire pressure signal set and the second tire pressure signal set having the wake-up signal using a receiver having at least an inactive state, the wake-up signal ensuring receipt of the first and second tire pressure signal sets when the receiver is in the inactive state by waking up the receiver,
    the first tire pressure signal set and the second tire pressure signal set being transmitted in a repeated pattern of signal sets during a predetermined time period independent of vehicle movement and vehicle ignition ON and OFF state.

12. The process of claim 11 wherein said transmission pattern of signal sets includes at least one second tire pressure signal set being transmitted alternately with at least one first tire pressure signal set.

13. The process of claim 11 wherein said transmission pattern includes the first signal set being transmitted at least twice in succession and the second signal set being transmitted only once.

* * * * *